(12) United States Patent
Iben

(10) Patent No.: US 9,620,154 B1
(45) Date of Patent: Apr. 11, 2017

(54) CHARACTERIZATION OF DIELECTRIC BREAKDOWN IN TMR SENSORS

(71) Applicant: International Business Machines Corporation, Armonk, NY (US)

(72) Inventor: Icko E. T. Iben, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/259,112

(22) Filed: Sep. 8, 2016

(51) Int. Cl.
    *G11B 5/455* (2006.01)
    *G11B 5/39* (2006.01)

(52) U.S. Cl.
    CPC ............ *G11B 5/455* (2013.01); *G11B 5/3909* (2013.01)

(58) Field of Classification Search
    CPC .............................. G11B 5/3909; G11B 5/455
    (Continued)

(56) References Cited

U.S. PATENT DOCUMENTS 6,178,074 B1   1/2001  Gill
6,473,257 B1 * 10/2002 Shimazawa ............ G11B 5/455
                                                                     360/324.2

(Continued)

OTHER PUBLICATIONS

Ahmad et al., "Compensating for Loss of Current Through Shorted Tunneling Magnetoresistance Sensors", U.S. Appl. No. 14/927,906, filed Oct. 30, 2015, 42 pages.

(Continued)

*Primary Examiner* — Wayne Young
*Assistant Examiner* — James L Habermehl
(74) *Attorney, Agent, or Firm* — Steven L. Fisher-Stawinski

(57) ABSTRACT

A method operates a digital measurement unit and an ambient temperature control unit as to a plurality of TMR sensors, each having a geometry including area $A_{mr}$ and tunnel barrier thickness $t_B$. The method includes dividing the plurality of TMR sensors into test groups. For each test group, the method includes setting the ambient air temperature $T_{air}$, applying a voltage pulse at $V_{deg}$ and time $\tau_p$ $N_{pulse}$ times until dielectric breakdown, and appending $N_{pulse}$ and $\tau_p$ to a dataset. The method includes fitting a survival fraction of form:

$$S(t_{deg}, \tau_{db}) = e^{-\left(\frac{t_{deg}}{\tau_{db}}\right)^\beta}$$

versus $N_{pulse}$, wherein $t_{deg} = N_{pulse} \cdot \tau_p$, to determine $\beta$ and $\tau_{db}$. The method includes determining a temperature rise based on $\tau_p$, determining, based on the temperature rise, $\kappa_{mr}(\tau_{db}, A_{mr})$, and determining $$T_{mr} = T_{air} + \frac{P_{mr}}{\kappa_{mr}(\tau_{db}, A_{mr})}$$

based on $\kappa_{mr}(\tau_{db}, A_{mr})$. The method includes fitting $$\tau_{db} = \tau_0(A_{mr}) \cdot e^{\left(\frac{U - \eta \cdot V_{deg}}{k_B \cdot T_{mr}}\right)}$$

with $$\tau_0(A_{mr}) = \tau_{00} \cdot (A_{mr})^{\frac{1}{\beta}}.$$

(Continued)

The method further includes returning an analytical form for a dielectric breakdown voltage for the geometry.

20 Claims, 8 Drawing Sheets

(58) Field of Classification Search
USPC .................................................. 360/69, 75
See application file for complete search history.

(56) References Cited

U.S. PATENT DOCUMENTS

| | | | |
|---|---|---|---|
| 6,741,433 B1 | 5/2004 | Nishioka | |
| 6,769,170 B1* | 8/2004 | Shimazawa | G11B 5/3903 29/593 |
| 6,903,889 B2 | 6/2005 | Li et al. | |
| 6,960,480 B1 | 11/2005 | Horng et al. | |
| 7,193,824 B2* | 3/2007 | Naka | G11B 5/455 29/603.09 |
| 7,317,597 B2* | 1/2008 | Naka | G11B 5/455 29/603.09 |
| 7,667,456 B2* | 2/2010 | Naka | G11B 5/455 324/210 |
| 7,804,657 B1 | 9/2010 | Hogg et al. | |
| 7,872,824 B1 | 1/2011 | Macchioni et al. | |
| 8,044,816 B2 | 10/2011 | Axtman et al. | |
| 8,902,531 B2 | 12/2014 | Bui et al. | |
| 8,988,835 B1 | 3/2015 | Biskeborn et al. | |
| 9,214,172 B2 | 12/2015 | Li et al. | |
| 9,418,685 B1 | 8/2016 | Ahmad et al. | |
| 2009/0153995 A1* | 6/2009 | Jang | G11B 5/455 360/31 |
| 2016/0093320 A1 | 3/2016 | Aria et al. | |

OTHER PUBLICATIONS

Ahmad et al., "Compensating for Loss of Current Through Shorted Tunneling Magnetoresistance Sensors", U.S. Appl. No. 15/180,230, filed Jun. 13, 2016, 36 pages.

Biskborn et al., "Diagnostics in TMR Sensors", U.S. Appl. No. 15/193,620, filed Jun. 27, 2016, 61 pages.

Chen et al., "Ultra-Fast Transmission Line Pulse Testing of Tunneling and Giant Magnetoresistive Recording Heads", EOS/ESD Symposium 2008, pp. 3B.2-1-3B2-4, 1-56537-146-7, © 2008 ESDA.

Childress et al., "Low-resistance IrMn and PtMn tunnel valves for recording head applications", Journal of Applied Physics, vol. 89, No. 11, Jun. 1, 2001, DOI: 10.1063/1.1361050, 5 pages, retrieved on Feb. 4, 2016, © 2001 American Institute of Physics.

Ha et al., "Effect of the resistance-area product on the temperature increase of nanopillar for spin torque magnetic memory", Current Applied Physics 10 (2010), Contents lists available at ScienceDirect, pp. 659-663, Available online Aug. 22, 2009, © 2009 Elsevier B.V., <http://dx.doi.org/10.1016/j.cap2009.08.013>.

Iben, Icko Eric Timothy, "Dynamic Temperature Rise of Shielded MR Sensors During Simulated Electrostatic Discharge Pulses of Variable Pulse Width", 2004 EOS/ESD Symposium, 10 pages, 1-58537-063-0, © 2004 ESD Association.

Iben, Icko Eric Timothy, "Thermal characteristics of a PtMn GMR sensor subjected to square wave EOS pulses", EOS/ESD Symposium, pp. 06-120-06-130, 1-58537-115-7, © 2006 ESDA.

Ille et al., "Ultra-thin Gate Oxide Reliability in the ESD Time Domain", EOS/ESD Symposium, pp. 06-285-6-294, 1-58537-115-7, © 2006 ESDA.

Jiang et al., "Pulse Stress Testing for Ultra-thin MgO Barrier Magnetic Tunnel Junctions", 29th Electrical Overstress/Electrostatic Discharge Symposium, 2007, pp. 07-111-07-116, DOI: 10.1109/EOSESD.2007.4401740, <http://ieeexplore.ieee.org/document/4401740/>.

Maloney, Timothy J., "Unified Model of 1-D Pulsed Heating, Combining Wunsch-Bell with the Dwyer Curve", 2016 EOS/ESD Symposium, Garden Grove, CA, Sep. 11-16, 2016, pp. 1-8, This paper is co-copyrighted by Intel corporation and the ESD Association.

Oliver et al., "Dielectric breakdown in magnetic tunnel junctions having an ultrathin barrier", Journal of Applied Physics, vol. 91, No. 7, Apr. 1, 2002, © 2002 American Institute of Physics, pp. 4348-4352.

Oliver et al., "Two breakdown mechanisms in ultrathin alumina barrier magnetic tunnel junctions", Journal of Applied Physics, vol. 95, No. 3, Feb. 1, 2004, Received Aug. 27, 2003; accepted Oct. 31, 2003, pp. 1315-1322, © 2004 American Institute of Physics.

Simmons, John G., "Generalized Formula for the Electric Tunnel Effect between Similar Electrodes Separated by a Thin Insulating Film", Journal of Applied Physics, vol. 34, No. 6, June 1963, pp. 1793-1803, doi: 10.1063/1.1702682.

Sousa et al., "Tunneling hot spots and heating in magnetic tunnel junctions", Journal of Applied Physics, vol. 95, No. 11, Jun. 1, 2004, (Presented on Jan. 7, 2004), pp. 6783-6785, © 2004 American Institute of Physics.

Surawanitkun et al., "Magnetic Instability in Tunneling Magnetoresistive Heads Due to Temperature Increase During Electrostatic Discharge", IEEE Transactions on Device and Materials Reliability, vol. 12, No. 3, Sep. 2012, pp. 570-575, © 2012 IEEE.

Taurian et al., "Self-Consistent Electronic Structures of MgO and SrO", Solid State Communications, vol. 55, No. 4, pp. 351-355, 1985, (Received Dec. 20, 1984).

Tsunekawa et al., "Giant tunneling magnetoresistance effect in low-resistance CoFeB/MgO(001) CoFeB magnetic tunnel junctions for read-head applications", Applied Physics Letters 87, (2005), pp. 87, 072503-1-87, 072503-3, © 2005 American Institute of Physics.

Ventura et al., "Electromigration in thin tunnel junctions with ferromagnetic/nonmagnetic electrodes: Nanoconstrictions, local heating, and direct and wind forces", Physical Review B 72 (2005), pp. 094432-1-094432-7, © 2005 The American Physical Society, <http://dx.doi.org/10.1103/PhysRevB.72.094432>.

Yuasa et al., Giant room-temperature magnetoresistance in single-crystal Fe/MgO/Fe magnetic tunnel junctions, nature material | vol. 3 | Dec. 2004. Published online: Oct. 31, 2004, doi:10.1038/nmat1257, pp. 868-871, © 2004 Nature Publishing Group.

* cited by examiner

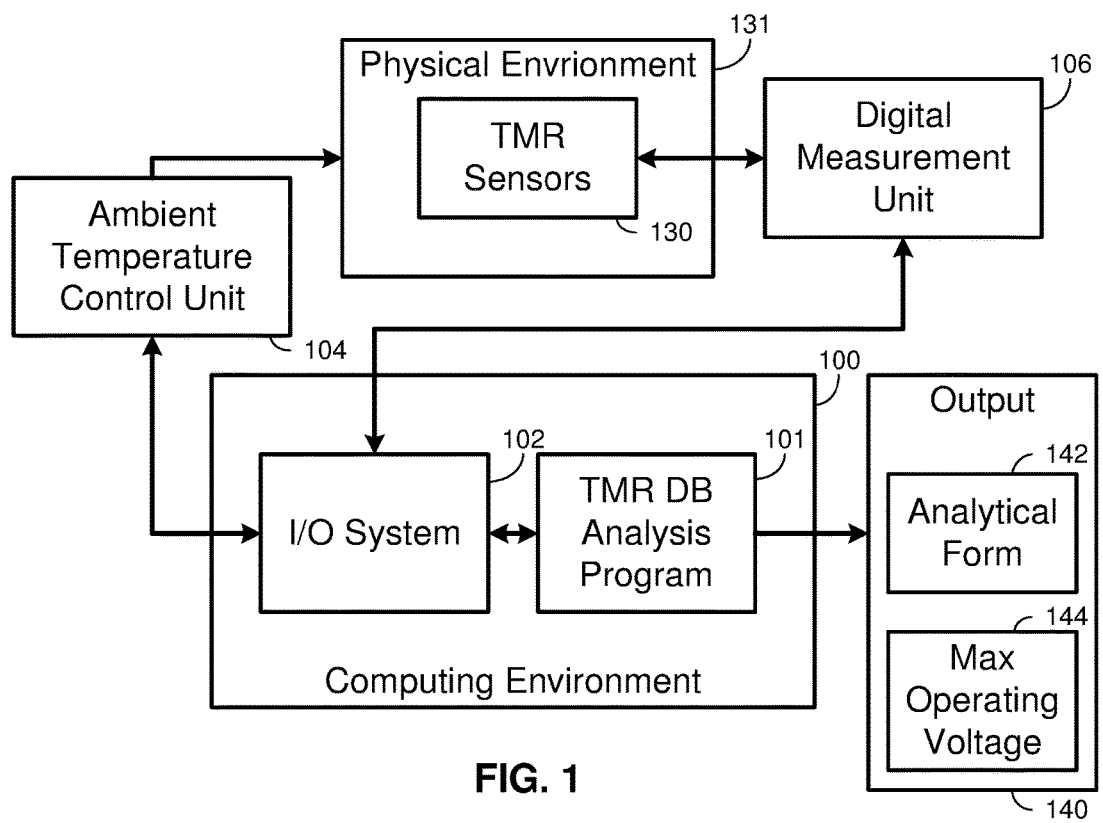
FIG. 1
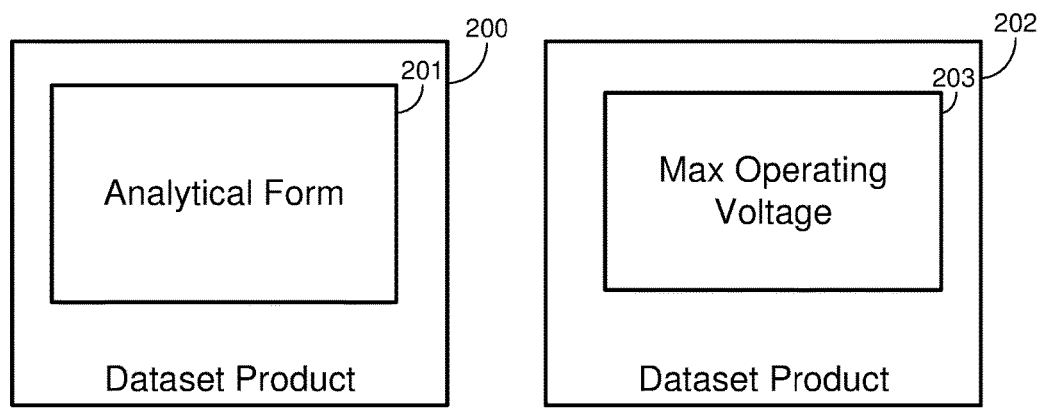
FIG. 2A  FIG. 2B

CHARACTERIZATION OF DIELECTRIC BREAKDOWN IN TMR SENSORS

BACKGROUND

The present invention relates generally to the field of magnetic storage devices such as magnetic tape drives and hard disk drives, and more particularly to configuring operational parameters for reader elements incorporated into magnetic storage devices.

Tunneling magnetoresistive ("TMR") sensors are microelectronic devices that are characterized by a change in electrical resistance in response to changes of a magnetic field. In recent years, new magnetic storage devices, such as magnetic tape drives and hard disk drives, have been developed that rely upon TMR sensors to read data from magnetic media. Different regions of magnetic media correspond to bits of data, each of which can apply either of two different magnetic field states to the TMR sensor. The value of each bit, one or zero, can be determined electronically by measuring resistance across the TMR sensor such that one state may be characterized by a relatively high resistance and the other characterized by a relatively low resistance.

As with all microelectronic devices, TMR sensors experience hardware failures of various kinds. In particular, TMR sensors can experience dielectric breakdown with a risk factor that generally increases over the product lifetime. Since a magnetic storage product may include multiple read head devices, each incorporating multiple TMR-based reader elements, Engineers and designers of product firmware face challenges in quantifying the risk of any individual TMR-based reader element experiencing dielectric breakdown.

SUMMARY

A device for performing a computer-implemented method includes one or more processors in electronic communication with a digital measurement unit and an ambient temperature control unit. The digital measurement unit is in electrical communication with a plurality of TMR sensors. Each of the plurality of TMR sensors includes a tunnel barrier. Each of the plurality of TMR sensors is structured according to a geometry. The geometry includes an area designated $A_{mr}$ and a thickness of the tunnel barrier designated $t_B$. The ambient temperature control unit is configured for controlling an ambient temperature at the plurality of TMR sensors. The computer-implemented method includes dividing the plurality of TMR sensors into at least two test groups, and assigning each of the at least two test groups a temperature parameter value $T_{air}$, a voltage pulse time parameter value $\tau_p$, and a predetermined pulse voltage $V_{deg}$. For each test group of the at least two test groups, with the test group including two or more test group TMR sensors, the computer-implemented method further includes setting to $T_{air}$, via the ambient temperature control unit, the ambient air temperature, applying a voltage pulse of magnitude $V_{deg}$ and time $\tau_p$ to each test group TMR sensor repeatedly $N_{pulse}$ times until the test group TMR sensor undergoes dielectric breakdown, and appending, to a data set, $N_{pulse}$ and $\tau_p$ for each of the test group TMR sensors. The computer-implemented method includes fitting, based on the data set, a survival fraction of form:

$$S(t_{deg}, \tau_{db}) = e^{-\left(\frac{t_{deg}}{\tau_{db}}\right)^\beta}$$

versus $N_{pulse}$, wherein $t_{deg} = N_{pulse} \cdot \tau_p$, to determine $\beta$ and $\tau_{db}$. The computer-implemented method further includes performing finite element analysis for the geometry to yield a temperature rise of the tunnel barrier versus $V_{deg}$, based on $\tau_p$, determining, based on the temperature rise, a thermal conductance $\kappa_{mr}(\tau_{db}, A_{mr})$ for the tunnel barrier, and determining a tunnel barrier temperature $$T_{mr} = T_{air} + \frac{P_{mr}}{\kappa_{mr}(\tau_{db}, A_{mr})},$$

wherein $P_{mr}$ is a power in the tunnel barrier, based on the thermal conductance. The computer-implemented method further includes fitting $$\tau_{db} = \tau_0(A_{mr}) \cdot e^{\left(\frac{U - \eta \cdot V_{deg}}{k_B \cdot T_{mr}}\right)}$$

with $$\tau_0(A_{mr}) = \tau_{00} \cdot (A_{mr})^{\frac{1}{\beta}},$$

wherein $k_B$ is Boltzmann's constant, wherein $$\eta = \frac{\gamma \cdot Z \cdot a}{t_B},$$

wherein Z is a charge of a metal of an oxide material of the tunnel barrier, wherein $\alpha$ is a lattice constant of the metal, wherein U denotes a fittable activation energy of the tunnel barrier, and wherein $\gamma$ and $\tau_{00}$ are fittable parameters. The computer-implemented method further includes returning an analytical form for a dielectric breakdown voltage for the geometry. The analytical form includes values of $\beta$, $\tau_{00}$, U, and $\gamma$. Corresponding electronic dataset products, computer program products, and computer systems are also disclosed.

According to an aspect of the invention, the computer-implemented is performed such that $\kappa_{mr}(\tau_{db}, A_{mr})$ is determined, in equilibrium, by fitting $\kappa_{mreq} = \kappa_0 + \kappa_A \cdot A_{mr}$ to yield values of $\kappa_0$ and $\kappa_A$ using finite element analysis, based on the geometry and on at least one predetermined thermal conductivity for at least one material of any of the plurality of TMR sensors.

According to another aspect of the invention elaborating upon the above-described aspect, the computer-implemented method further includes (i) identifying, for a magnetic storage device, a predetermined lifetime requirement given as $\tau_L$ and a predetermined average failure rate given as B, wherein the magnetic storage device includes N of the TMR sensors, according to the geometry, and (ii) determining a maximum safe operating voltage given as $V_{opMax}$, for any of the N TMR sensors of said magnetic storage device, by computing $$V_{opMax} = \frac{\left[U - \left[\frac{\kappa_B \cdot T_{mreq}}{\beta}\right] \cdot \ln\left(\frac{N \cdot (\tau_L)^\beta}{B \cdot \tau_0}\right)\right]}{\eta},$$

wherein $$T_{mreq} = T_{air} + \frac{P_{mr}}{\kappa_{mreq}}$$

and $$\tau_L(N, B) = \tau_{db} \cdot \left(\frac{B}{N}\right)^{\frac{1}{\beta}}$$

based on said analytical form for said geometry.

According to another aspect of the invention elaborating upon the above-described aspect, the computer-implemented method further includes operating the magnetic storage device subject to a constraint of applying a voltage to the N TMR sensors that is equal to or less than the maximum safe operating voltage. A corresponding magnetic storage device incorporating controller firmware according to the constraint is also disclosed.

BRIEF DESCRIPTION OF THE DRAWINGS

FIG. 1 is a block diagram illustrating a computing environment suitable for processing a TMR dielectric breakdown analysis program, together with various interface devices, in accordance with at least one embodiment of the invention.

FIG. 2A is a schematic diagram of an electronic dataset product holding an encoded analytical form for a TMR sensor according to a geometry, in accordance with at least one embodiment of the invention.

FIG. 2B is a schematic diagram of an electronic dataset product holding an encoded maximum operating voltage for a magnetic storage device incorporating a TMR sensor according to a geometry, in accordance with at least one embodiment of the invention.

DETAILED DESCRIPTION

Figure 3:
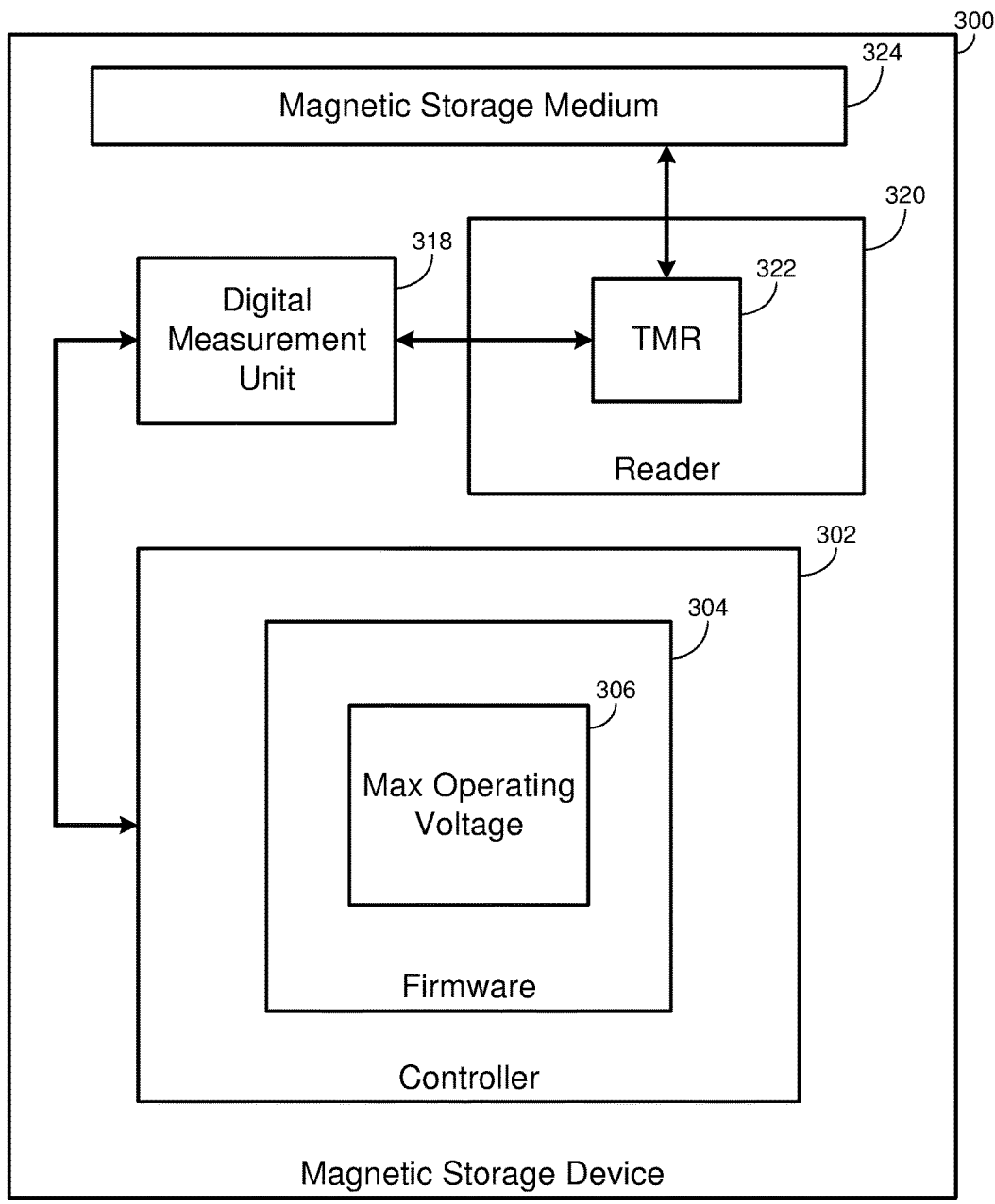
FIG. 3 is a schematic diagram of a magnetic storage device incorporating a TMR sensor according to a geometry and a firmware incorporating a maximum operating voltage for the TMR sensor, in accordance with at least one embodiment of the invention.

Referring now to the invention in more detail, FIG. 1 depicts an operational environment for a TMR dielectric breakdown analysis program 101, in accordance with at least one embodiment of the present invention. A computing environment 100 is provided. The computing environment may be any general purpose computer, including individual and distributed computing environments, physical and virtual computing environments, etc. operating on any underlying processing hardware such as desktop, laptop, notebook, server, or handheld computers. The computing environment 100 may operate according to the computer 900 of FIG. 9. In the depicted embodiment, the computing environment includes an input/output ("I/O") system 102, which supports electronic communication between the computing environment 100 and both an ambient temperature control unit 104 and digital measurement unit 106.

Referring still to the embodiment of FIG. 1, a physical environment 131 includes the immediate surroundings of test bed TMR sensors 130, which are structured according to a given geometry. The test bed TMR sensors 130, in context of various embodiments, are used to determine various electrical and thermal properties in general for any TMR sensor according to the given geometry, which may be incorporated into one or more data products, according to methods described and claimed herein. The geometry includes at least the various layers of the TMR sensor device and the materials of those layers, discussed in greater detail below, as well as the cross-sectional area orthogonal to the flow of current through the TMR sensor. The physical environment 131 includes a quantity of air surrounding the test bed TMR sensors 130. Like production TMR sensors, the test bed TMR sensors 130 include an air bearing surface corresponding to the location under a movable magnetic storage medium, such as a magnetic tape or disk platter. Non-air bearing portions of TMR sensors, whether production TMR sensors or test bed TMR sensors 130 may be embedded in a dielectric substrate material such as alumina ($Al_2O_3$).

The air temperature surrounding the test bed TMR sensors 130 may be subject to control by various methods of heating and cooling, for example by mixing artificially heated air with room temperature air or artificially cooled air. Such mixing may be achieved by the ambient temperature control unit 104 via electronic control of air heating and/or cooling and/or flow in conjunction with electronic temperature sensing and/or monitoring in proximity to the test bed TMR sensors 130. Temperature monitoring may be measured in air near the air bearing surfaces of the test bed TMR sensors 130 and/or in or on the solid material of the test bed TMR sensors 130 or the solid material of the test bed TMR sensors 130 themselves. In some embodiments, sensors may be applied to measure the temperature of specific regions of the test bed TMR sensors 130, such as the tunnel barrier. Thus, the ambient temperature control unit 104 is enables electronically setting and verifying the ambient temperature of the physical environment 131 by the TMR dielectric breakdown analysis program 101.

Referring still to the embodiment depicted in FIG. 1, the digital measurement unit 106 is in electrical and/or electronic communication with each of the test bed TMR sensors 130. The digital measurement unit 106 is configured for applying an electronically determined bias current through each test bed TMR sensor 130 in a manner similar to in-device bias currents that may be experienced. The digital measurement unit 106 is similarly configured to sense and/or measure, directly or indirectly, various electrical properties of the test bed TMR sensors 130, including at least resistance, voltage, power, and actual current. Each quantity may be measured across, in, or through the TMR sensor in the direction of bias current as well as in other locations, for example across the tunnel barrier layer only. Thus, via the digital measurement unit 106, the TMR dielectric breakdown analysis program is enabled to make electronic measurements and controls of various electrical properties of the test bed TMR sensors 130.

Referring still to the embodiment depicted in FIG. 1, the TMR dielectric breakdown analysis program 101 is configured, by various methods herein disclosed, to produce as output 140 an analytical form 142 for any TMR sensor constructed according to the geometry of the test bed TMR sensors 130. In some embodiments, the TMR dielectric breakdown analysis program 101 determines, by methods herein disclosed, a maximum operating voltage 144 for any TMR according the geometry that is incorporated into a magnetic storage device. The maximum operating voltage 144 may be understood as a safety limit for operating a TMR sensor according to the geometry in a storage device whereby the TMR sensors in the storage device are expected to not experience dielectric breakdown within the expected or required usable lifetime of the storage device.

The output 140, if including analytical form 142, may be encoded electronically on an electronic data storage medium such as a hard disk or solid state disk. Such an electronic medium may be provided, according to FIG. 2A, as a dataset product 200 with the analytical form 201 encoded thereon. According to FIG. 2B, an alternative dataset product 202 may encode the maximum operating voltage 203 instead of or in addition to the analytical form 201. It will be understood that the term "dataset product" as used herein should be interpreted always to exclude a "signal per se" or other transitory media.

FIG. 3 depicts an embodiment wherein at least a maximum operating voltage 306 is included on an embedded data storage medium for a firmware 304. In the depicted embodiment, the firmware is for the operation of a controller 302, which provides software control for a magnetic storage device 300. In various embodiments, the magnetic storage device 300 may be a magnetic tape drive, hard disk drive, or other digital or analog electronic data storage device that relies upon selective magnetization of regions of a magnetic medium. Whether a tape, disk, or other medium, such magnetic material is encompassed by the magnetic storage medium 324. The controller 302 may be any computer, for example one or more onboard and/or embedded processors together with local memory, that is configured for low-level operation of the magnetic storage device 300. The firmware 304, for operation on and/or by the one or more onboard and/or embedded processors may include conventionally understood "firmware", as in a controller program stored in programmable non-volatile memory, as well as any means of storing computer program instructions for the operation of the controller 302, including "software" program instructions stored on disk or in volatile memory, "hard-coded" program instructions stored on a ROM, machine instructions, or micro-ops.

Referring still to the embodiment of FIG. 3, the magnetic storage medium 324 is configured to be read by a reader 320. The controller 302 may be configured to a move a target region of the magnetic storage medium into close proximity of the reader 320. In the case of a tape drive, the controller 302 may wind the tape forward or backward until a target region is directly over the reader 320. In the case of a hard disk, the controller 302 may rotate the disk until a desired region is over the reader 320. In various embodiments, the reader 320 contains several TMRs 322, corresponding to covering the full area of the magnetic storage medium 324. In the case of a tape drive, several TMRs 322, for example eight, may be arranged linearly perpendicular to the direction of motion of the tape, thus ensuring that the entire width of the tape is used to retrieve encoded data. In a hard disk embodiment, the reader 320 includes several TMRs 322 mounted on a moving actuator arm, which swings controllably on an arc to move the reader 320 over the disk platter(s). By combining the swing position of the arm with rotation of the disk, the controller 302 can position one of the TMRs 322 over substantially any position on the disk to utilize the full area of the disk. Thus, the reader 320 may be understood to include a number of TMRs 322 sufficient to read from the usable area of the magnetic storage medium 324. In the depicted embodiment, magnetic reading is achieved by a digital measurement unit 318, which at least detects changes in resistance in the TMR 322. The controller 302 correlates changes in resistance in the TMR 322, as measured by the digital measurement unit 318, with bits of data stored on the magnetic storage medium 324.

By encoding the maximum operating voltage 306 and/or a representation of an analytical form for the TMRs 322 onto a storage medium associated with the firmware 304, as shown, the controller is enabled to observe a restriction whereby controller 302 applies to the TMRs 322 a voltage that is equal to or less than the maximum operating voltage 306.

Figure 4A:
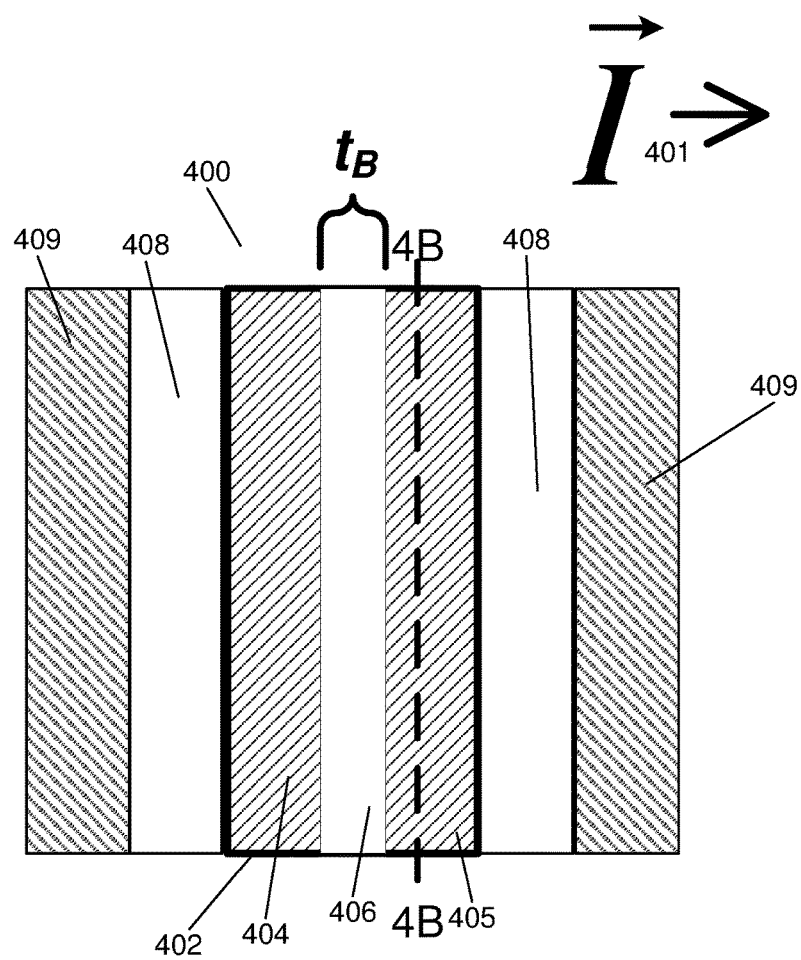
FIG. 4A is a plan view of a TMR sensor according to a geometry, as viewed at an air bearing surface, in accordance with at least one embodiment of the invention.
Figure 4B:
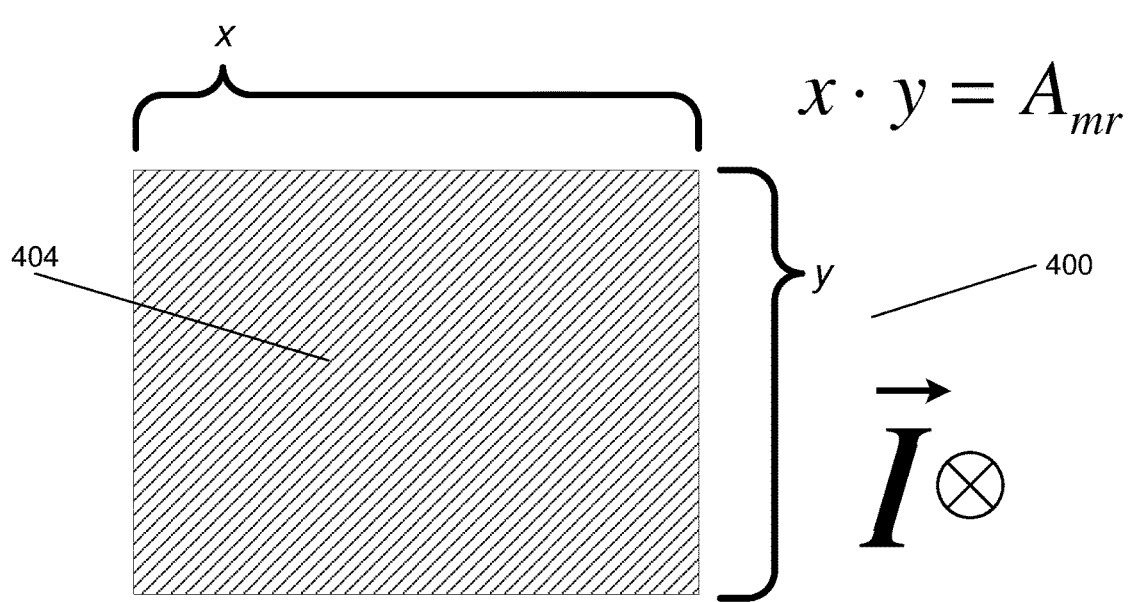
FIG. 4B is a sectional view of the TMR sensor of FIG. 4A along the cut line designated therein, in accordance with at least one embodiment of the invention.

FIGS. 4A and 4B depict a possible geometry 400 for a TMR sensor according to the invention. The geometry 400 includes various shapes and materials for particular TMR sensors. The TMR dielectric breakdown analysis program 101 is configured to learn a geometry-specific characterization of the TMR sensor that will be applicable to any TMR sensor according to the geometry 400. In FIG. 4A, the bias current direction 401 designates the direction of current (which may be positive or negative along the dimension indicated), with the current given by the vector quantity $\vec{I}$. In FIG. 4A, cut line 4B designates the sectional plane of FIG. 4B. In the depicted embodiment, the TMR sensor includes a pair of ferromagnetic layers surrounding a tunnel barrier layer 406. The ferromagnetic layers include a pinned layer 404 and free layer 405. The TMR sensor is configured such that the pinned layer has a fixed magnetic field orientation, while the free layer is allowed to change magnetic field orientation in response to changes in the magnetic field of the storage medium, such as a tape, running over the TMR sensor. The pinned layer 404 may include a single ferromagnetic layer, or it may include a bilayer of an antiferromagnetic layer with a ferromagnetic layer, or it may include multiple layers, such as an antiferromagnetic layer and a synthetic ferromagnet made up of two ferromagnetic layers and a spacer layer, the thickness of which is configured to antiferromagnetic ally couple the two ferromagnetic layers. In such embodiments, the constituent layers of the pinned layer 404 combine to have a stable pinned ferromagnetic layer abutting the tunnel barrier layer 406. The free layer 405, is configured so as to rotate its magnetization in response to externally applied magnetic fields. The free Layer 405 may include a single layer or a bilayer of ferromagnetic material(s).

Together, the pinned layer 404, free layer 405, and tunnel barrier layer 406 form a tunnel junction 402. The quantity $t_B$ designates the thickness of the tunnel barrier layer 406. The tunnel junction is surrounded on each side by contacts 408, also termed in the art as leads, which place the tunnel junction in electrical communication with a measurement and/or control circuit, such as a component of a digital measurement unit 106. In the case of TMR sensors, the contacts 408, in the depicted embodiment, are composed of nonmagnetic material. In the depicted embodiment, the TMR sensor may be understood as configured for high density recording, which uses shields 409. The contacts 408 are surrounded on either side by, and in electrical communication with, the shields 409, which protect the tunnel junction 402 from electromagnetic interference from nearby devices.

FIG. 4B depicts a sectional view of the geometry 400. In the sectional view of FIG. 4B, the current $\vec{I}$ is designated as flowing into (or, for negative values, out of) the plane of the view. In cross section, taken through one of the ferromagnetic layers 404 and 405, FIG. 4B depicts an area $A_{mr} = x \cdot y$, where x and y are the dimensions of the rectangular cross section of the TMR sensor, as shown. For non-rectangular cross sections, the area may be given by the appropriate area for the actual cross sectional shape of the TMR sensor. It will be understood that, in general, and in the below equations, the area of a TMR sensor refers to the cross sectional area in a plane orthogonal to the direction of current.

Referring still to the geometry 400 of various embodiments according to FIGS. 4A and 4B, the geometry includes various material properties of the TMR sensor. For example, the tunnel barrier layer 406 may be constructed of a metal oxide material, such as MgO or $AL_2O_3$. In the below equations, such a charge on a metal oxide material in the tunnel barrier layer 406 is given as Z. Value for Z may be determined from published listings of known material properties and/or determined from known behavior of the particular materials used. Similarly, each material layer of the TMR sensor may be described in terms of a lattice constant, given as $\alpha$. As used in the below equations, the lattice constant $\alpha$ may be understood as the physical dimension of a unit cell of the particular material layer described, in the dimension of the direction of current $\vec{I}$.

Figure 5:
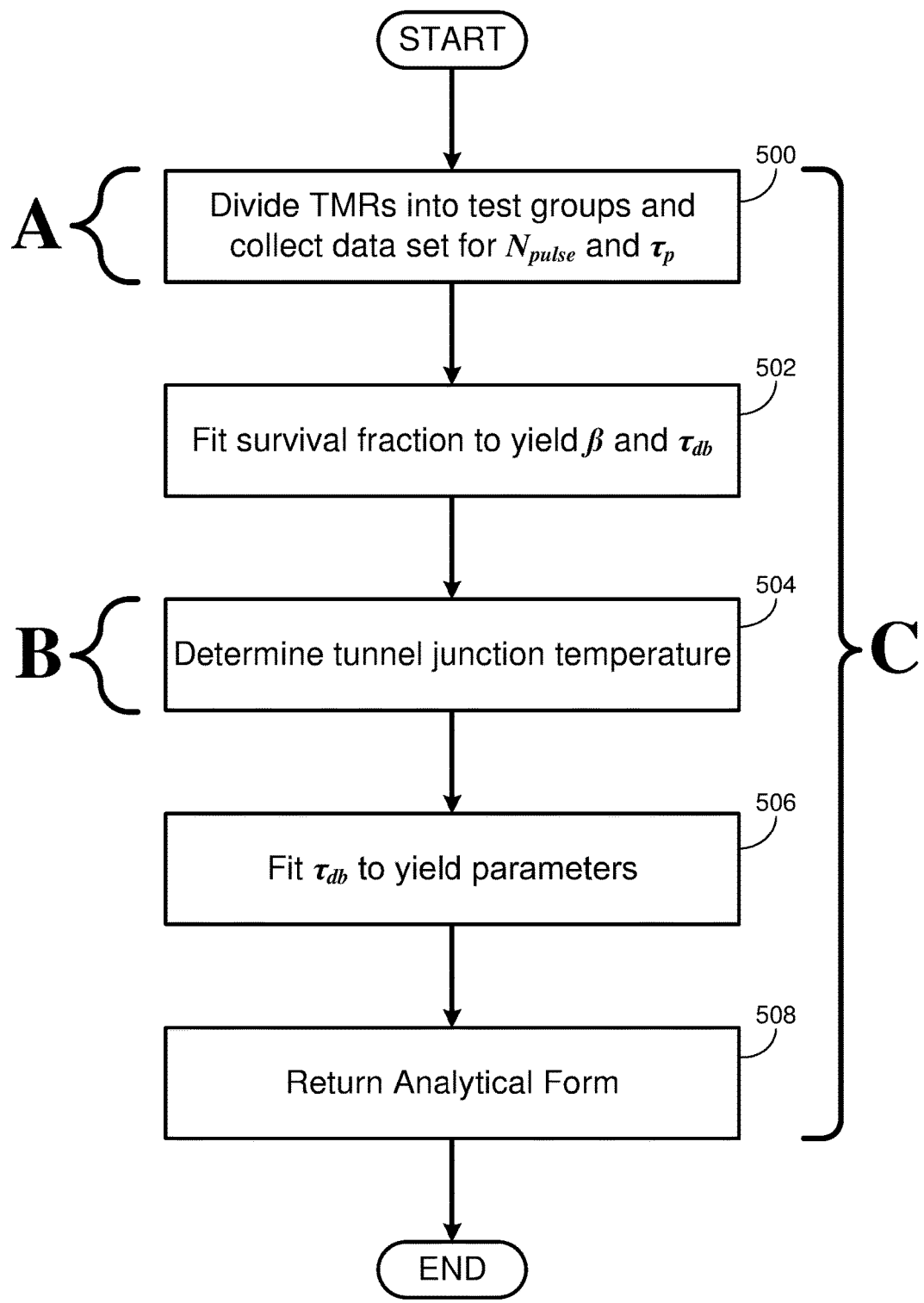
FIG. 5 is a flowchart diagram for a TMR dielectric breakdown analysis program, in accordance with at least one embodiment of the invention.
Figure 6:
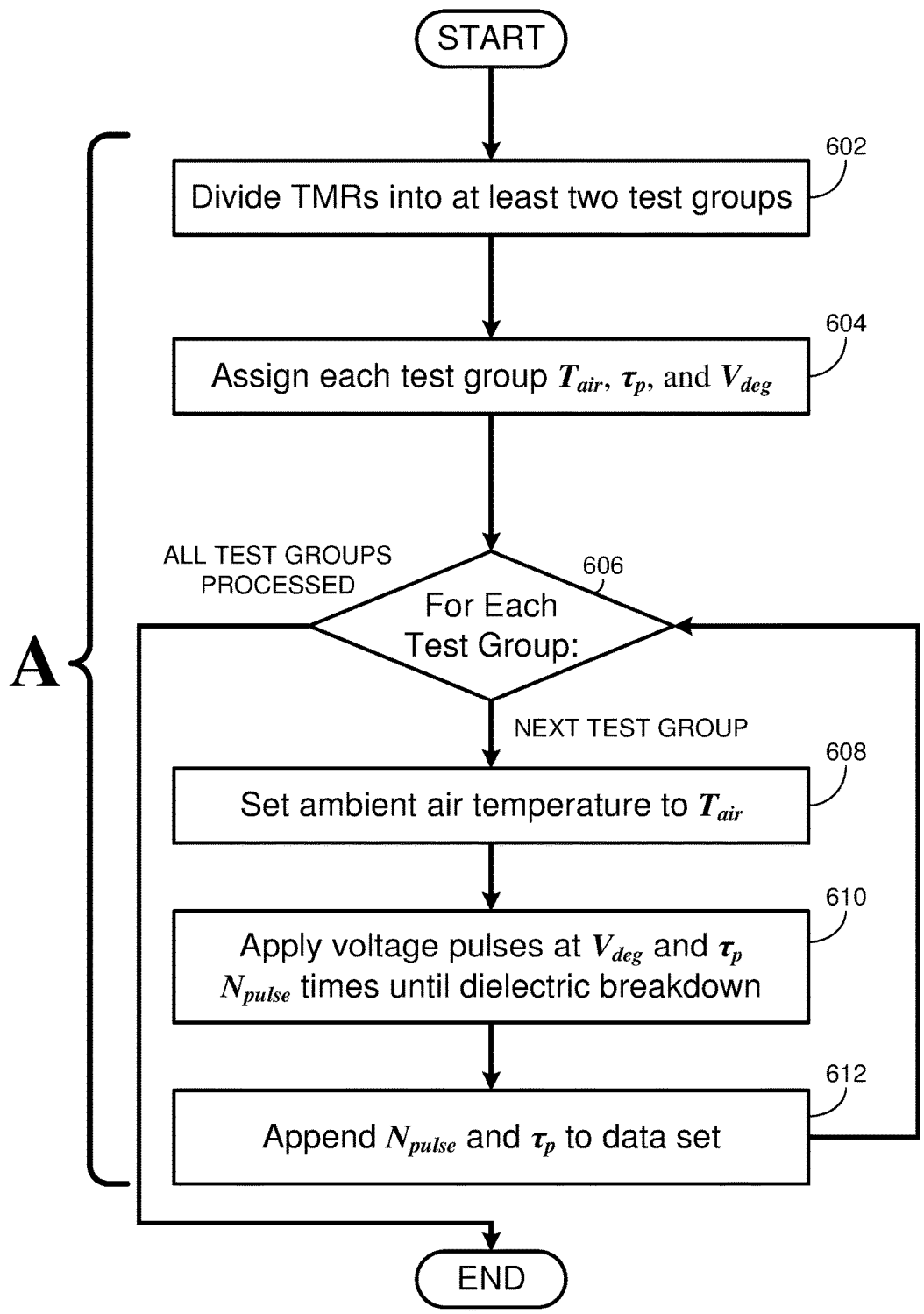
FIG. 6 is a flowchart diagram showing various steps for portion A of the TMR dielectric breakdown analysis program of FIG. 5, in accordance with at least one embodiment of the invention.
Figure 7:
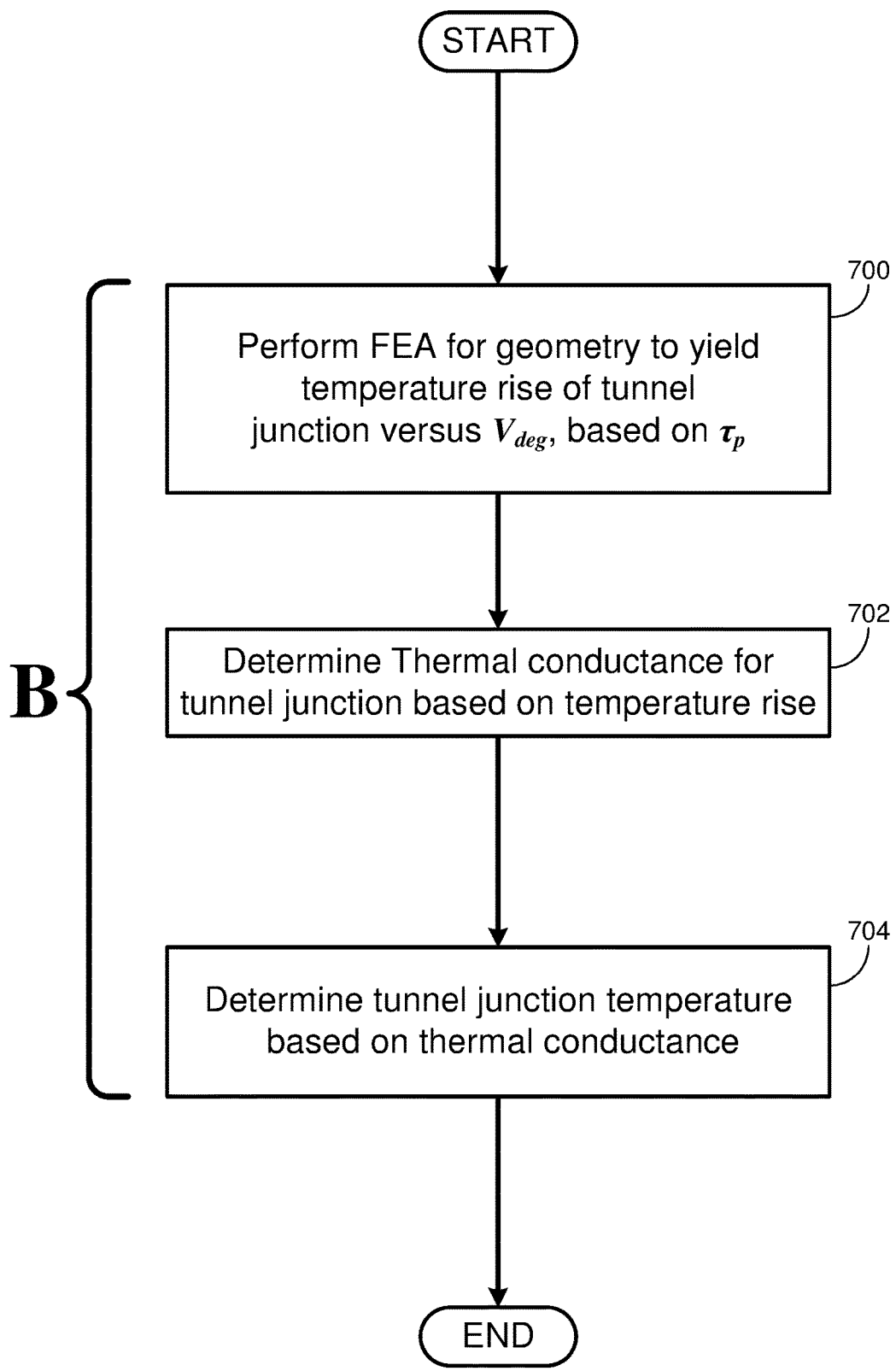
FIG. 7 is a flowchart diagram showing various steps for portion B of the TMR dielectric breakdown analysis program of FIG. 5, in accordance with at least one embodiment of the invention.

Referring now to the flowchart diagrams of FIGS. 5-8. FIGS. 5-8 depict various operational steps for a TMR dielectric breakdown analysis program 101, in accordance with at least one embodiment of the invention. In the figures, various groupings of steps are designated by capital letters, which cross-reference between the several flowchart diagrams. Specifically, in FIG. 6, steps 602-612 are designated A, which correspond to substeps for step 500, according to FIG. 5. In FIG. 7, steps 700-704 are designated B, which correspond to substeps for step 504, according to FIG. 5. In FIG. 5, steps 500-508 are designated C, which are summarized as step 800 in FIG. 8.

Referring now to step 500 of FIG. 5, in the depicted embodiment, the TMR dielectric breakdown analysis program 101 divides the test bed TMR sensors 130 into at least two test groups and collects a data set. FIG. 6 provides substeps, according to at least one embodiment of the invention.

At step 602, the TMR dielectric breakdown analysis program 101 divides the test group TMR sensors 130 into at least two test groups. In various embodiments, at least four test groups are used, with at least two values of $T_{air}$ and $\tau_p$, as described in further detail below. Each test group is subjected to different test parameters for the purpose of allowing the TMR dielectric breakdown analysis program to discern or "learn", in the sense of machine learning, the properties of devices according to the geometry 400. In particular, the TMR dielectric breakdown analysis program may vary ambient temperature for the test groups, via the ambient temperature control unit 104, the time or pulse width for various voltage pulses applied to the TMR sensors in each test group, and the predetermined pulse voltage $V_{deg}$. The value of $V_{deg}$ for each group may be configured such that the TMR sensors will not breakdown during the first pulse and that all the TMR sensors will breakdown within a reasonable number of pulses, for example between ~10 and ~1000 pulses. A reasonable number of pulses may be set such that the tests are completed on timescales of hours to days or a few weeks. Accordingly, at step 604, the TMR dielectric breakdown analysis program assigns each test group a temperature parameter value $T_{air}$ a voltage pulse time parameter value $\tau_p$, and a predetermined pulse voltage $V_{deg}$.

Various embodiments may employ more than two, specifically four or more, test groups with different values of $T_{air}$ and $\tau_p$, as well as other parameters entirely. The inventor has observed and/or recognized that various numbers of text groups and/or combinations of $T_{air}$ and $\tau_p$ are useful (though not to be construed as required in all embodiments) to fully characterize the properties of TMRs according to the geometry 400. Specifically, the inventor has observed and/or recognized that it is beneficial to use at least two values of $T_{air}$, for example a cold value representing a TMR-based device operating at or near room temperature, and a hot value representing a TMR-based device operating for long periods in an enclosed space with multiple other exothermic devices. Further, the inventor has observed and/or recognized that it is beneficial to use at least two values of $\tau_p$. In such embodiments, the at least two values of $\tau_p$ may beneficially differ by at least two orders of magnitude in time, which may also be understood as pulse width or, more generally, the duration of the voltage pulse from when voltage is raised above a baseline to when the voltage returns to the baseline, regardless of when the peak at $V_{deg}$ occurs. The inventor has further observed and/or recognized that, in some embodiments, it may be useful to test at least four values of $\tau_p$ that span ten, twelve, or more orders of magnitude in time, with the intermediate values at substantially different intermediate orders of magnitude. The wider the range in the stress parameters and the times chosen, then the more accurate the extrapolation to long times (e.g., years) will be.

Referring still to the flowchart diagram of FIG. 6, at decision block 606, the TMR dielectric breakdown analysis program 101 iteratively process the test groups, with each test group including two or more of the test bed TMR sensors 130. At step 608 (decision block 606, "NEXT TEST GROUP" branch), the TMR dielectric breakdown analysis program sets, to $T_{air}$, the ambient air temperature surrounding those test bed TMR sensors 130 that belong to the test group, using the ambient temperature control unit as described above. At step 610, the TMR dielectric breakdown analysis program 101 applies voltage pulses to each of the test bed TMR sensors 130 that belong to the test group using the digital measurement unit 106, as described above. Each pulse is at $V_{deg}$ and for $\tau_p$, which may be understood to mean that the peak voltage applied to the TMR sensor at the point in time of the pulse's maximum intensity is equal to $V_{deg}$ and that the duration of the pulse from when voltage is elevated above baseline to when the voltage returns to baseline.

In the depicted embodiment, the TMR dielectric breakdown analysis program 101 applies the voltage pulses until detecting, via the digital measurement unit 106, that dielectric breakdown has occurred, and storing, for example as a software variable, the count of pulses. The symbol $N_{pulse}$ represents the number of pulses needed to achieve dielectric breakdown in a single TMR sensor. The TMR dielectric breakdown analysis program may detect and/or confirm a dielectric breakdown in the TMR sensor by comparing the measured resistance of the TMR sensor before application of the voltage pulses with the measured resistance after applying the voltage pulses. A drop in measured resistance may be taken as indicative of a short due to a new electric pathway being created in the TMR sensor. In the context of test bed TMR sensors 130, where the TMR dielectric breakdown analysis program 101 is repeatedly applying voltage pulses, it may be inferred that an observed short is due to a dielectric breakdown, as opposed to another cause. For example, the test bed TMR sensors 130 may be installed in the test system without being incorporated into a tape drive and therefore not subject to a magnetic tape running across the reader, and therefore a tape scratch can be ruled out as the cause of measured drop in resistance, which is interpreted as a short. By way of comparison, the inventor refers to and incorporates herein by reference, U.S. patent application Ser. No. 15/193,620, which includes methods for diagnosing dielectric breakdown in production TMR-based magnetic storage devices.

The TMR dielectric breakdown analysis program 101 may perform application of the voltage pulses sequentially for each TMR sensor in the test group, and for each test group, or may perform the application of the voltage pulses with various degrees of computational (as opposed to electrical) parallelization. For example, the TMR sensors of the different test groups may be configured for separate application of voltage pulses using electrically isolated and independently controllable modules of the digital measurement unit 106, and thus the TMR dielectric breakdown analysis program may perform the measurements in (computational) parallel. Alternatively, TMR sensors within the test group may be subjected to the same voltage pulse via the same circuit in (electrical) parallel. In such an embodiment, the TMR dielectric breakdown analysis program 101 maintains a separate pulse count for each TMR sensor of the test group and separately tests each TMR sensor after applying the pulse to determine whether dielectric breakdown has occurred.

Referring still to the flowchart diagram of FIG. 6, at step 612, the TMR dielectric breakdown analysis program 101 appends each $N_{pulse}$ and $\tau_p$ to a data set. The data set may include an object list, multidimensional array, database table, or other data structure that stores relationships of $N_{pulse}$ to $\tau_p$ for a given $V_{deg}$. Thus, upon completion of iterating at decision block 606 by the TMR dielectric breakdown analysis program 101, the data set may be understood to include sufficient data for various regressions and other analytical steps, as further described below.

In the depicted embodiment, at decision block 606, "ALL TEST GROUPS PROCESSED" branch, the TMR dielectric breakdown analysis program 101 proceeds out of the substeps designated A and continues in FIG. 5 at step 502. At step 502, the TMR dielectric breakdown analysis program 101 performs fitting of a survival fraction for the data set to yield values for a parameter β and a time to dielectric breakdown $\tau_{db}$, according to Equations 1 and 2:

$$S(t_{deg}, \tau_{db}) = e^{-\left(\frac{t_{deg}}{\tau_{db}}\right)^\beta} \quad \text{Equation 1}$$

$$t_{deg} = N_{pulse} \cdot \tau_p \quad \text{Equation 2}$$

As per equation 1, the survival fraction S is given as a function of $t_{deg}$ and $\tau_{db}$, with $t_{deg}$ given in Equation 2. In the data set, $N_{pulse}$ and $\tau_p$ are known, and thus if S is plotted versus $N_{pulse}$, it is possible to fit and/or regress to find approximate solutions for $\tau_{db}$ and β, by any of various well-known computational and/or mathematical methods.

Referring still to FIG. 5, at step 504, the TMR dielectric breakdown analysis program 101 determines a temperature for the tunnel junction 402. FIG. 7 provides a flowchart diagram of various substeps B for step 504. Referring now to the flowchart diagram of FIG. 7, at step 700, the dielectric breakdown analysis program 101 performs Finite Element Analysis (FEA) to yield the temperature rise of tunnel junction 402 versus $V_{deg}$ based on $\tau_p$. The FEA may be understood as based on the geometry 400, and the elements may be understood as individual material layers and sublayers of the TMR, as shown in FIG. 4.

Referring still to the flowchart diagram of FIG. 7, at step 702, the TMR dielectric breakdown analysis program 101 determines a thermal conductance $\kappa_{mr}$ for the tunnel junction 402 based on the temperature rise determined at step 700. The thermal conductance may be given at $\kappa_{mr}(\tau_{db}, A_{mr})$, that is, thermal conductance may be understood to depend upon the time dielectric breakdown determined at step 502 and the area of the TMR, given by the geometry 400. With the temperature rise known from step 700, the thermal conductance for the composite TMR sensor follows for the geometry.

Referring still to the flowchart diagram of FIG. 7, at step 704, the TMR dielectric breakdown analysis program 101 determines a tunnel junction temperature $T_{mr}$ based on the determined thermal conductance, as per Equation 3:

$$T_{mr} = T_{air} + \frac{P_{mr}}{\kappa_{mr}(\tau_{db}, A_{mr})} \quad \text{Equation 3}$$

In Equation 3, $P_{mr}$ is a level of power in the tunnel junction 402 (understood as based on current times voltage through the tunnel junction 402 according to the well-known law P=V·I). Thus, as per Equation 3, the tunnel junction temperature may be understood as based on the thermal conductance.

Referring now to FIG. 5, at step 506, the TMR dielectric breakdown analysis program 101 continues from the substeps designated B at step 506 by fitting $\tau_{db}$ to yield various parameters, according to Equations 4-6:

$$\tau_{db} = \tau_0(A_{mr}) \cdot e^{\left(\frac{U - \eta \cdot V_{deg}}{k_B \cdot T_{mr}}\right)} \quad \text{Equation 4}$$

$$\tau_0(A_{mr}) = \tau_{00} \cdot (A_{mr})^{\frac{1}{\beta}} \quad \text{Equation 5}$$

$$\eta = \frac{\gamma \cdot Z \cdot a}{t_B} \qquad \text{Equation 6}$$

In Equations 4 and 5, $k_B$ is Boltzmann's constant, Z is a charge of the metal of a metal-oxide material of the tunnel barrier layer 406, and a is a lattice constant of that metal. For example, for an insulating layer of MgO, then Z=2. For an insulating layer of $Al_2O_3$, then Z=3. Further, in equation 4, U denotes a fittable activation energy of the tunnel junction, and $\gamma$ and $\tau_{00}$ are fittable parameters.

Referring still to the flowchart diagram of FIG. 5, at step 508, the TMR dielectric breakdown analysis program 101 returns (i.e., in the sense of a computational function or method) an analytical form for a dielectric breakdown voltage (i.e., $V_{deg}$) for the geometry 400. The analytical form may include a computational representation of values for $\beta$, $\tau_{00}$, and U, and $\gamma$.

Figure 8:
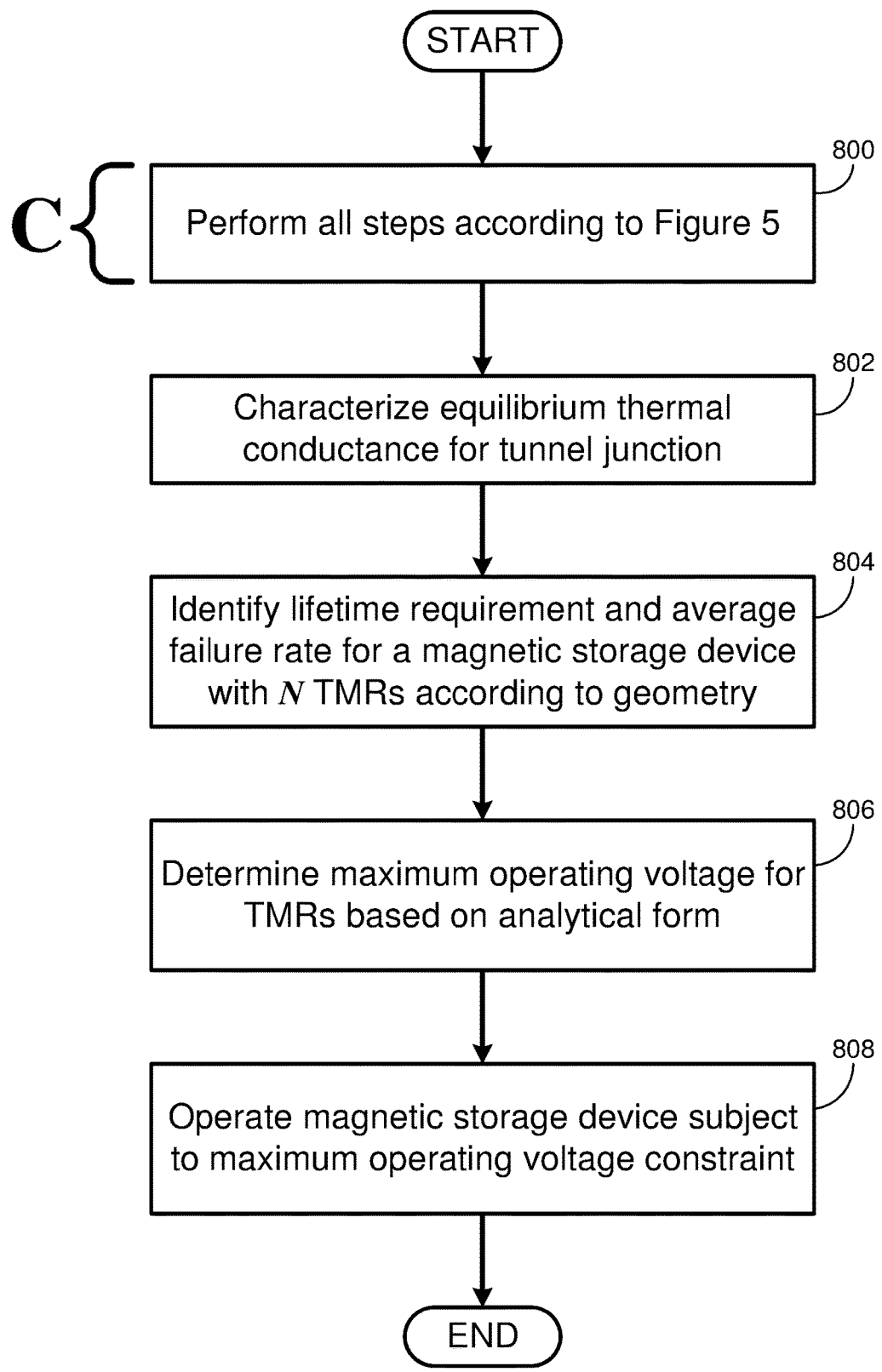
FIG. 8 is a flowchart diagram showing various additional steps for the TMR dielectric breakdown analysis program of FIG. 5, in accordance with at least one embodiment of the invention.

Referring now to FIG. 8, FIG. 8 presents a flowchart diagram for various additional steps for the TMR dielectric breakdown analysis program 101, in accordance with at least one embodiment of the invention. At step 800, in the depicted embodiment, the TMR dielectric breakdown analysis program 101 performs all of steps and substeps 500-508, designated C, to yield the analytical form.

At step 802, the TMR dielectric breakdown analysis program 101 characterizes the equilibrium thermal conductance for the tunnel junction 402. It will be understood by those skilled in the art that thermal conductance of materials varies nonlinearly with respect to time, temperature, current, and other factors, however the TMR sensor and/or the tunnel junction layers in particular, are expected to reach an equilibrium thermal conductance on timescales of microseconds to seconds upon being powered up (having a bias current applied) as in a magnetic storage reader. Thus, where only equilibrium values for the thermal conductance matter for analysis, the TMR dielectric breakdown analysis program may adjust timescales of both measurement and/or computation to not account for pre-equilibrium nonlinearities. Specifically, the equilibrium thermal conductance $\kappa_{mreq}$ is given in Equation 7:

$$\kappa_{mreq} = \kappa_0 + \kappa_A \cdot A_{mr} \qquad \text{Equation 7}$$

The TMR dielectric breakdown analysis program may measure and/or compute the equilibrium thermal conductance at the appropriate timescales, as described above, and may use the result to fit, via finite element analysis, Equation 7, to yield approximate solution values for $\kappa_0$ and $\kappa_A$. The finite elements may be layers of the TMR sensor and/or of the tunnel junction specifically, with each element of a given thermal conductance. It will be understood that, while thermal conductance values for many bulk materials may be available in published tables, it is known that various metal oxides and other materials of the TMR sensor and/or tunnel junction may behave differently in very thin layers. If, as may be the case, thermal conductivities for various material layers is not well-characterized, it is possible to approximate the aggregate thermal conductivity for multiple layers.

$$\kappa_{mr} = \kappa_{mreq} + A_{mr} \cdot \left[ \frac{K_1}{t} + \frac{K_2}{\sqrt{t}} \right] \qquad \text{Equation 8}$$

In equation 8, K1 and K2 are fitting parameters based on the heat capacities and the thermal conductivities for the materials chosen. Thus, whether particular thermal conductivities for the various material layers are previously well-characterized or fit according to Equation 8, then the TMR dielectric breakdown analysis program 101 may be understood to be based on the geometry and on at least one predetermined thermal conductivity for at least one material of the TMR sensor.

Referring still to the flowchart diagram of FIG. 8, at step 804, the TMR dielectric breakdown analysis program identifies, for a magnetic storage device including N of the TMR sensors according to the geometry 400, a predetermined lifetime requirement given as $\tau_L$ and a predetermined average failure rate for the group as a whole given as B. The predetermined lifetime requirement and failure rate may be set according to engineering and business considerations, including how long the overall device should be expected to be in service, and what chance of failure during that time would be acceptable to users of the product. These values may be user-configured, hard-coded, looked up from a network source, or otherwise provided by input and stored computationally as a variable or program constant. At step 806, the TMR dielectric breakdown analysis program 101 determines a maximum safe operating voltage given as $V_{opMax}$, for any of the N TMR sensors of said magnetic storage device, by computing according to Equations 9-11:

$$V_{opMax} = \frac{\left[ U - \left[ \frac{\kappa_B \cdot T_{mreq}}{\beta} \right] \cdot \ln\left( \frac{N \cdot (\tau_L)^\beta}{B \cdot \tau_0} \right) \right]}{\eta} \qquad \text{Equation 9}$$

$$\tau_L = \tau_{db} \cdot \left( \frac{B}{N} \right)^{\frac{1}{\beta}} \qquad \text{Equation 10}$$

$$T_{mreq} = T_{air} + \frac{P_{mr}}{\kappa_{mreq}} \qquad \text{Equation 11}$$

Thus, in Equations 9-11, the maximum operating voltage may understood to be based on and/or to depend upon the previously determined analytical form for the geometry and its included parameters. Equation 10 defines $\tau_L$ in terms of the previously determined parameters B and N, and Equation 11 defines $T_{mreq}$ in terms of the previously determined parameters. With $V_{opMax}$ determined, the magnetic storage device may then be configured to operate, at step 808, according to the constraint of applying a voltage to the N tunneling magnetoresistive sensors that is equal to or less than $V_{opMax}$.

While Equation 9 give $V_{opMax}$, it is apparent that $V_{opMax}$ is on both sides of Equation 9 because $\tau_L$ is given by Equation 4 in the case where $V_{deg} = V_{opMax}$. Combining Equations 4, 9, and 10 yields:

$$V_{opMax}^2 + \left( \frac{\eta \cdot D}{F} \right) \cdot V_{opMax} - \left( \frac{U \cdot D}{F} - D \cdot T_{air} \right) = 0 \qquad \text{Equation 12}$$

$$F = \left(\frac{k_B}{\beta}\right) \cdot \ln\left(\frac{N \cdot \tau_L \cdot A_{mr}^{\frac{1}{\beta}}}{B \cdot \tau_{00}}\right) \quad \text{Equation 13}$$

$$D = R_A \cdot \left(\kappa_A + \frac{\kappa_0}{A_{mr}}\right) \quad \text{Equation 14}$$

Solving for $V_{opMax}$ yields Equation 15:

$$V_{opMax} = \left[\frac{\eta \cdot D}{2 \cdot F}\right] \cdot \left[-1 + \sqrt{1 + \left[\frac{2 \cdot F}{\eta \cdot D}\right]^2 \cdot \left[\frac{U \cdot D}{F} - D \cdot T_{air}\right]}\right] \quad \text{Equation 15}$$

Thus, the TMR dielectric breakdown analysis program 101 may compute $V_{opMax}$.

Figure 9:
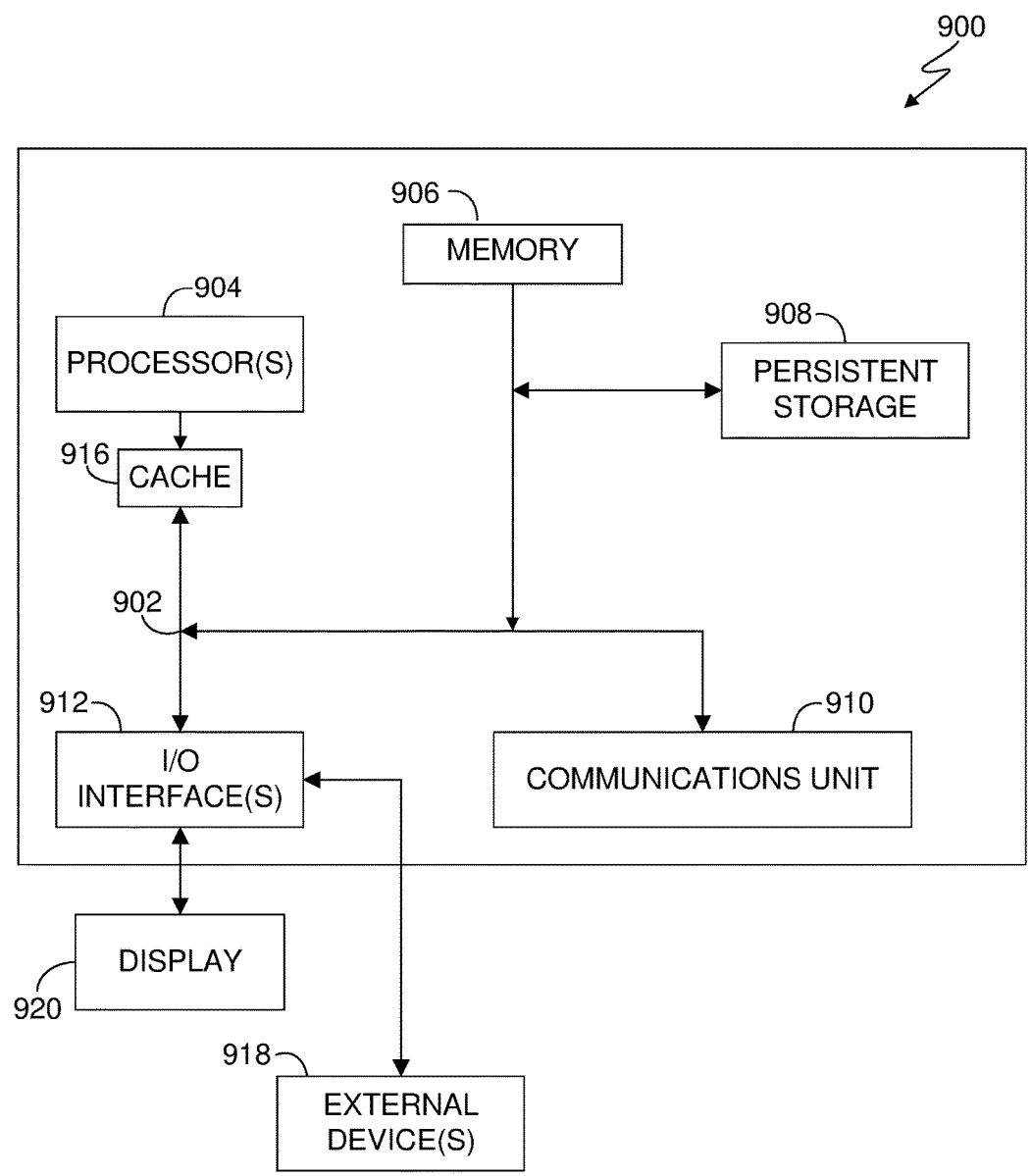
FIG. 9 is a block diagram depicting various logical elements for a computer system capable of executing program instructions, in accordance with at least one embodiment of the present invention.

FIG. 9 is a block diagram depicting components of a computer 900 suitable for executing the TMR dielectric breakdown analysis program 101. FIG. 9 displays the computer 900, the one or more processor(s) 904 (including one or more computer processors), the communications fabric 902, the memory 906, the RAM, the cache 916, the persistent storage 908, the communications unit 910, the I/O interfaces 912, the display 920, and the external devices 918. It should be appreciated that FIG. 9 provides only an illustration of one embodiment and does not imply any limitations with regard to the environments in which different embodiments may be implemented. Many modifications to the depicted environment may be made.

As depicted, the computer 900 operates over a communications fabric 902, which provides communications between the cache 916, the computer processor(s) 904, the memory 906, the persistent storage 908, the communications unit 910, and the input/output (I/O) interface(s) 912. The communications fabric 902 may be implemented with any architecture suitable for passing data and/or control information between the processors 904 (e.g., microprocessors, communications processors, and network processors, etc.), the memory 906, the external devices 918, and any other hardware components within a system. For example, the communications fabric 902 may be implemented with one or more buses or a crossbar switch.

The memory 906 and persistent storage 908 are computer readable storage media. In the depicted embodiment, the memory 906 includes a random access memory (RAM). In general, the memory 906 may include any suitable volatile or non-volatile implementations of one or more computer readable storage media. The cache 916 is a fast memory that enhances the performance of computer processor(s) 904 by holding recently accessed data, and data near accessed data, from memory 906.

Program instructions for the TMR dielectric breakdown analysis program 101 may be stored in the persistent storage 908 or in memory 906, or more generally, any computer readable storage media, for execution by one or more of the respective computer processors 904 via the cache 916. The persistent storage 908 may include a magnetic hard disk drive. Alternatively, or in addition to a magnetic hard disk drive, the persistent storage 908 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 908 may also be removable. For example, a removable hard drive may be used for persistent storage 908. Other examples include optical and magnetic disks, thumb drives, and smart cards that are inserted into a drive for transfer onto another computer readable storage medium that is also part of the persistent storage 908.

The communications unit 910, in these examples, provides for communications with other data processing systems or devices. In these examples, the communications unit 910 may include one or more network interface cards. The communications unit 910 may provide communications through the use of either or both physical and wireless communications links. TMR dielectric breakdown analysis program 101 may be downloaded to the persistent storage 908 through the communications unit 910. In the context of some embodiments of the present invention, the source of the various input data may be physically remote to the computer 900 such that the input data may be received and the output similarly transmitted via the communications unit 910.

The I/O interface(s) 912 allows for input and output of data with other devices that may operate in conjunction with the computer 900. For example, the I/O interface 912 may provide a connection to the external devices 918, which may include a keyboard, keypad, a touch screen, and/or some other suitable input devices. External devices 918 may also include portable computer readable storage media, for example, thumb drives, portable optical or magnetic disks, and memory cards. Software and data used to practice embodiments of the present invention may be stored on such portable computer readable storage media and may be loaded onto the persistent storage 908 via the I/O interface(s) 912. The I/O interface(s) 912 may similarly connect to a display 920. The display 920 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising, by one or more processors in electronic communication with a digital measurement unit and an ambient temperature control unit,
   wherein said digital measurement unit is in electrical communication with a plurality of tunneling magnetoresistive sensors,
   wherein each of said plurality of tunneling magnetoresistive sensors comprises a tunnel barrier,
   wherein each of said plurality of tunneling magnetoresistive sensors is structured according to a geometry, said geometry comprising an area designated $A_{mr}$ and a thickness of said tunnel barrier designated $t_B$, and
   wherein said ambient temperature control unit is configured for controlling an ambient temperature at said plurality of tunneling magnetoresistive sensors:
   dividing said plurality of tunneling magnetoresistive sensors into at least two test groups;
   assigning each of said at least two test groups a temperature parameter value $T_{air}$, a voltage pulse time parameter value $\tau_p$, and a predetermined pulse voltage $V_{deg}$;
   for each test group of said at least two test groups, said test group comprising two or more test group tunneling magnetoresistive sensors:

setting to $T_{air}$, via said ambient temperature control unit, said ambient air temperature, applying a voltage pulse of magnitude $V_{deg}$ and time $\tau_p$ to each said test group tunneling magnetoresistive sensor repeatedly $N_{pulse}$ times until said test group tunneling magnetoresistive sensor undergoes dielectric breakdown, and appending, to a data set, $N_{pulse}$ and $\tau_p$ for each of said test group tunneling magnetoresistive sensors;

fitting, based on said data set, a survival fraction of form:

$$S(t_{deg}, \tau_{db}) = e^{-\left(\frac{t_{deg}}{\tau_{db}}\right)^\beta}$$

versus $N_{pulse}$, wherein $t_{deg} = N_{pulse} \cdot \tau_p$, to determine $\beta$ and $\tau_{db}$;

performing finite element analysis for said geometry to yield a temperature rise of said tunnel barrier versus $V_{deg}$, based on $\tau_p$;

determining, based on said temperature rise, a thermal conductance $\kappa_{mr}(\tau_{db}, A_{mr})$ for said tunnel barrier;

determining a tunnel barrier temperature $$T_{mr} = T_{air} + \frac{P_{mr}}{\kappa_{mr}(\tau_{db}, A_{mr})},$$

wherein $P_{mr}$ is a power in said tunnel barrier, based on said thermal conductance;

fitting $$\tau_{db} = \tau_0(A_{mr}) \cdot e^{\left(\frac{U - \eta \cdot V_{deg}}{k_B \cdot T_{mr}}\right)}$$

with $$\tau_0(A_{mr}) = \tau_{00} \cdot (A_{mr})^{\frac{1}{\beta}},$$

wherein $k_B$ is Boltzmann's constant, wherein $$\eta = \frac{\gamma \cdot Z \cdot a}{t_B},$$

wherein $Z$ is a charge or a metal of an oxide material of said tunnel barrier, wherein $a$ is a lattice constant of said metal, wherein $U$ denotes a fittable activation energy of said tunnel barrier, and wherein $\gamma$ and $\tau_{00}$ are fittable parameters; and returning an analytical form for a dielectric breakdown voltage for said geometry, said analytical form comprising values of $\beta$, $\tau_{00}$, $U$, and $\gamma$.

2. The computer-implemented method of claim 1, wherein said $\kappa_{mr}(\tau_{db}, A_{mr})$ is determined, in equilibrium, by fitting $\kappa_{mreq} = \kappa_0 + \kappa_A \cdot A_{mr}$ to yield values of $\kappa_0$ and $\kappa_A$ using finite element analysis, based on said geometry and on at least one predetermined thermal conductivity for at least one material of any of said plurality of tunneling magnetoresistive sensors.

3. The computer-implemented method of claim 2, further comprising:

identifying, for a magnetic storage device, a predetermined lifetime requirement given as $\tau_L$ and a predetermined average failure rate given as $B$, wherein said magnetic storage device comprises $N$ tunneling magnetoresistive sensors, according to said geometry; and determining a maximum safe operating voltage given as $V_{opMax}$, for any of said $N$ tunneling magnetoresistive sensors of said magnetic storage device, by computing $$V_{opMax} = \left[\frac{\eta \cdot D}{2 \cdot F}\right] \cdot \left[-1 + \sqrt{1 + \left[\frac{2 \cdot F}{\eta \cdot D}\right]^2 \cdot \left[\frac{U \cdot D}{F} - D \cdot T_{air}\right]}\right],$$

wherein $$F = \left(\frac{k_B}{\beta}\right) \cdot \ln\left(\frac{N \cdot \tau_L \cdot A_{mr}^{\frac{1}{\beta}}}{B \cdot \tau_{00}}\right) \text{ and } D = R_A \cdot \left(\kappa_A + \frac{\kappa_0}{A_{mr}}\right),$$

based on said analytical form for said geometry.

4. The computer-implemented method of claim 3, further comprising operating said magnetic storage device subject to a constraint of applying a voltage to said $N$ tunneling magnetoresistive sensors that is equal to or less than said maximum safe operating voltage.

5. The computer-implemented method of claim 1, wherein said at least two test groups comprise at least two values of $T_{air}$.

6. The computer-implemented method of claim 1, wherein said at least two test groups comprise at least two values of $\tau_p$, wherein said at least two values of $\tau_p$ differ by at least two orders of magnitude.

7. The computer-implemented method of claim 1, wherein said at least two values of $\tau_p$ are at least four in number and differ by at least ten orders of magnitude.

8. An electronic dataset product, comprising:
one or more computer readable storage media;
data stored on said one or more computer readable storage media;
said data comprising an analytical form for a dielectric breakdown voltage for a tunneling magnetoresistive sensor structured according to a geometry;
said geometry comprising an area designated $A_{mr}$ and a thickness of said tunnel barrier designated $t_B$;
said analytical form being determined by one or more processors in electronic communication with a digital measurement unit and an ambient temperature control unit:
wherein said digital measurement unit is in electrical communication with a plurality of tunneling magnetoresistive sensors according to said geometry,
wherein each of said plurality of tunneling magnetoresistive sensors comprises a tunnel barrier, and
wherein said ambient temperature control unit is configured for controlling an ambient temperature at said plurality of tunneling magnetoresistive sensors,
said one or more processors performing the steps of:
dividing said plurality of tunneling magnetoresistive sensors into at least two test groups;
assigning each of said at least two test groups a temperature parameter value $T_{air}$, a voltage pulse time parameter value $\tau_p$, and a predetermined pulse voltage $V_{deg}$;

for each test group of said at least two test groups, said test group comprising two or more test group tunneling magnetoresistive sensors:
  setting to $T_{air}$, via said ambient temperature control unit, said ambient air temperature,
  applying a voltage pulse of magnitude $V_{deg}$ and time $\tau_p$ to each said test group tunneling magnetoresistive sensor repeatedly $N_{pulse}$ times until said test group tunneling magnetoresistive sensor undergoes dielectric breakdown, and
  appending, to a data set, $N_{pulse}$ and $\tau_p$ for each of said test group tunneling magnetoresistive sensors;
fitting, based on said data set, a survival fraction of form:

$$S(t_{deg}, \tau_{db}) = e^{-\left(\frac{t_{deg}}{\tau_{db}}\right)^\beta}$$

versus $N_{pulse}$, wherein $t_{deg} = N_{pulse} \cdot \tau_p$, to determine $\beta$ and $\tau_{db}$;
performing finite element analysis for said geometry to yield a temperature rise of said tunnel barrier versus $V_{deg}$, based on $\tau_p$;
determining, based on said temperature rise, a thermal conductance $\kappa_{mr}(\tau_{db}, A_{mr})$ for said tunnel barrier;
determining a tunnel barrier temperature $$T_{mr} = T_{air} + \frac{P_{mr}}{\kappa_{mr}(\tau_{db}, A_{mr})},$$

wherein $P_{mr}$ is a power in said tunnel barrier, based on said thermal conductance;
fitting $$\tau_{db} = \tau_0(A_{mr}) \cdot e^{\left(\frac{U - \eta \cdot V_{deg}}{k_B \cdot T_{mr}}\right)}$$

with $$\tau_0(A_{mr}) = \tau_{00} \cdot (A_{mr})^{\frac{1}{\beta}},$$

wherein $k_B$ is Boltzmann's constant, wherein $$\eta = \frac{\gamma \cdot Z \cdot a}{t_B},$$

charge of a metal of an oxide material of said tunnel barrier, wherein a is a lattice constant of said metal, wherein U denotes a fittable activation energy of said tunnel barrier, and wherein $\gamma$ and $\tau_{00}$ are fittable parameters; and
returning said analytical form, said analytical form comprising values of $\beta$, $\tau_{00}$, U, and $\gamma$.

9. The electronic dataset product of claim 8, wherein said value of $\kappa_{mr}$ is determined, in equilibrium, by fitting $\kappa_{mreq} = \kappa_0 + \kappa_A \cdot A_{mr}$ to yield values of $\kappa_0$ and $\kappa_A$ using finite element analysis, based on said geometry and on at least one predetermined thermal conductivity for at least one material of any of said plurality of tunneling magnetoresistive sensors.

10. The electronic dataset product of claim 9, further comprising a maximum safe operating voltage, said maximum safe operating voltage being determined by said one or more processors performing the steps of:
identifying, for a magnetic storage device, a predetermined lifetime requirement given as $\tau_L$ and a predetermined average failure rate given as B, wherein said magnetic storage device comprises N tunneling magnetoresistive sensors, according to said geometry; and
determining a maximum safe operating voltage given as $V_{opMax}$, for any of said N tunneling magnetoresistive sensors of said magnetic storage device, by computing $$V_{opMax} = \left[\frac{\eta \cdot D}{2 \cdot F}\right] \cdot \left[-1 + \sqrt{1 + \left[\frac{2 \cdot F}{\eta \cdot D}\right]^2 \cdot \left[\frac{U \cdot D}{F} - D \cdot T_{air}\right]}\right],$$

wherein $$F = \left(\frac{k_B}{\beta}\right) \cdot \ln\left(\frac{N \cdot \tau_L \cdot A_{mr}^{\frac{1}{\beta}}}{B \cdot \tau_{00}}\right) \text{ and } D = R_A \cdot \left(\kappa_A + \frac{\kappa_0}{A_{mr}}\right),$$

based on said analytical form for said geometry.

11. The electronic dataset product of claim 10, wherein:
said electronic dataset is included in a firmware for said magnetic storage device; and
said magnetic storage device is operated subject to a constraint of applying a voltage to said N tunneling magnetoresistive sensors that is equal to or less than said maximum safe operating voltage.

12. The electronic dataset product of claim 11, wherein said magnetic storage device is a tape drive.

13. The electronic dataset product of claim 8, wherein said at least two test groups comprise at least two values of $T_{air}$.

14. The electronic dataset product of claim 8, wherein said at least two test groups comprise at least two values of $\tau_p$, wherein said at least two values of $\tau_p$ differ by at least two orders of magnitude.

15. The electronic dataset product of claim 8, wherein said at least two values of $\tau_p$ are at least four in number and differ by at least ten orders of magnitude.

16. A magnetic storage device, comprising:
a magnetic storage medium;
a controller configured for reading from said magnetic storage medium via N tunneling magnetoresistive sensors structured according to a geometry said geometry comprising an area designated $A_{mr}$ and a thickness of said tunnel barrier designated $t_B$;
said controller comprising one or more onboard processors, one or more computer readable storage media and firmware comprising computer program instructions for execution by said one or more onboard processors, said firmware being stored on said one or more computer readable storage media;
said computer program instructions comprising instructions to operate said magnetic storage device subject to a constraint of applying a voltage to said N tunneling magnetoresistive sensors that is equal to or less than a maximum safe operating voltage;
said maximum safe operating voltage having been determined by one or more processors in electronic communication with a digital measurement unit and an ambient temperature control unit:
wherein said digital measurement unit is in electrical communication with a plurality of tunneling magnetoresistive sensors according to said geometry,
wherein each of said plurality of tunneling magnetoresistive sensors comprises a tunnel barrier, and
wherein said ambient temperature control unit is configured for controlling an ambient temperature at said plurality of tunneling magnetoresistive sensors,
said one or more processors performing the steps of:
dividing said plurality of tunneling magnetoresistive sensors into at least two test groups;
assigning each of said at least two test groups a temperature parameter value $T_{air}$, a voltage pulse time parameter value $\tau_p$, and a predetermined pulse voltage $V_{deg}$;
for each test group of said at least two test groups, said test group comprising two or more test group tunneling magnetoresistive sensors:
setting to $T_{air}$, via said ambient temperature control unit, said ambient air temperature,
applying a voltage pulse of magnitude $V_{deg}$ and time $\tau_p$ to each said test group tunneling magnetoresistive sensor repeatedly $N_{pulse}$ times until said test group tunneling magnetoresistive sensor undergoes dielectric breakdown, and
appending, to a data set, $N_{pulse}$ and $\tau_p$ for each of said test group tunneling magnetoresistive sensors;
fitting, based on said data set, a survival fraction of form:

$$S(t_{deg}) = e^{-\left(\frac{t_{deg}}{\tau_p}\right)^\beta}$$

versus $N_{pulse}$, wherein $t_{deg} = N_{pulse} \cdot \tau_p$, to determine $\beta$;
performing finite element analysis for said geometry to yield a temperature rise of said tunnel barrier versus $V_{deg}$, based on $\tau_{deg}$;
determining, based on said temperature rise, a thermal conductance $\kappa_{mr}(\tau_{db}, A_{mr})$ for said tunnel barrier;
determining a tunnel barrier temperature $$T_{mr} = T_{air} + \frac{P_{mr}}{\kappa_{mr}(\tau_{db}, A_{mr})},$$

wherein $P_{mr}$ is a power in said tunnel barrier, based on said thermal conductance;
fitting $$\tau_{db} = \tau_0(A_{mr}) \cdot e^{\left(\frac{U - \eta \cdot V_{deg}}{k_B \cdot T_{mr}}\right)}$$

with $$\tau_0(A_{mr}) = \tau_{00} \cdot (A_{mr})^{\frac{1}{\beta}},$$

wherein $k_B$ is Boltzmann's constant, wherein $$\eta = \frac{\gamma \cdot Z \cdot a}{t_B},$$

wherein z, is a charge of a metal of an oxide material of said tunnel barrier, wherein a is a lattice constant of said metal, wherein U denotes a fittable activation energy of said tunnel barrier, and wherein $\gamma$ and $\tau_{00}$ are fittable parameters;
determining an analytical form for a dielectric breakdown voltage for said geometry, said analytical form comprising values of $\beta$, $\tau_{00}$, U, and $\gamma$;
determining said $\kappa_{mr}(\tau_{db}, A_{mr})$, in equilibrium, by fitting $\kappa_{mreq} = \kappa_0 + \kappa_A \cdot A_{mr}$ to yield values of $\kappa_0$ and $\kappa_A$ using finite element analysis, based on said geometry and on at least one predetermined thermal conductivity for at least one material of any of said plurality of tunneling magnetoresistive sensors;
identifying, for said magnetic storage device, a predetermined lifetime requirement given as $\tau_L$ and a predetermined average failure rate given as B; and
determining said maximum safe operating voltage given as $V_{opMax}$, for any of said N tunneling magnetoresistive sensors of said magnetic storage device, by computing $$V_{opMax} = \left[\frac{\eta \cdot D}{2 \cdot F}\right] \cdot \left[-1 + \sqrt{1 + \left[\frac{2 \cdot F}{\eta \cdot D}\right]^2 \cdot \left[\frac{U \cdot D}{F} - D \cdot T_{air}\right]}\right],$$

wherein $$F = \left(\frac{k_B}{\beta}\right) \cdot \ln\left(\frac{N \cdot \tau_L \cdot A_{mr}^{\frac{1}{\beta}}}{B \cdot \tau_{00}}\right) \text{ and } D = R_A \cdot \left(\kappa_A + \frac{\kappa_0}{A_{mr}}\right),$$

based on said analytical form for said geometry.

17. The magnetic storage device of claim 16, wherein said magnetic storage device is a tape drive.

18. The magnetic storage device of claim 16, wherein said at least two test groups comprise at least two values of $T_{air}$.

19. The magnetic storage device of claim 16, wherein said at least two test groups comprise at least two values of $\tau_p$, wherein said at least two values of $\tau_p$ differ by at least two orders of magnitude.

20. The magnetic storage device of claim 16, wherein said at least two values of $\tau_p$ are at least four in number and differ by at least ten orders of magnitude.

* * * * *